United States Patent [19]

Bingham

[11] 3,968,515
[45] July 6, 1976

[54] SINGLE FRAME COLOR ENCODING/DECODING SYSTEM

[75] Inventor: Joseph Peter Bingham, Princeton Junction, N.J.

[73] Assignee: RCA Corporation, New York, N.Y.

[22] Filed: Mar. 11, 1975

[21] Appl. No.: 557,412

[52] U.S. Cl. ............................ 358/5; 350/162 S F
[51] Int. Cl.² ...................... H04N 5/84; G02B 5/18
[58] Field of Search ................ 358/5, 2, 47, 43, 44, 358/53, 54, 55, 62; 350/162 SF

[56] References Cited
UNITED STATES PATENTS

| | | | |
|---|---|---|---|
| 3,421,809 | 1/1969 | Lohmann | 350/162 |
| 3,573,353 | 4/1971 | Henriques et al. | 358/5 |
| 3,647,945 | 3/1972 | Hannan | 358/5 |

*Primary Examiner*—John C. Martin
*Attorney, Agent, or Firm*—Eugene M. Whitacre; William H. Meagher; Dilip A. Kulkarni

[57] ABSTRACT

A single frame color encoding/decoding system for video cassette or film chain applications is disclosed which requires neither an unusually stable transport mechanism, nor a color television camera in the playback system. The color content of the scene modulates two high frequency (e.g., 1,000 lpi) spatial carriers in the encoded transparency arranged in quadrature. A monochromatic light source projects, a seriatim, a set of transparencies. A grating is rigidly fixed to the frame of a scanner adjacent to the transparency. The grating consists of a superposition of two unmodulated low frequency (e.g., 300 and 400 lpi) spatial carriers also oriented in quadrature. The color content of the scene is optically transferred from the transparency onto relatively stable and low frequency spatial carriers of the grating. A focusing lens, situated along the optical path, obtains a diffraction pattern of the product of the transparency and the grating in the Fourier transform plane. A suitable mask allows each color component, modulating only one of the spatial carriers cf the grating, to pass beyond the transform plane. An imaging lens images the scene color content, carried on the stable and low frequency (e.g. 300 and 400 lpi) spatial carriers of the grating, on an image plate. The scanner electron beam scans the image plate for translating the spatial frequencies of the grating into corresponding temporal electrical frequencies in the output of the scanner. A frequency selective circuit separates color component information in the output of the scanner.

14 Claims, 7 Drawing Figures

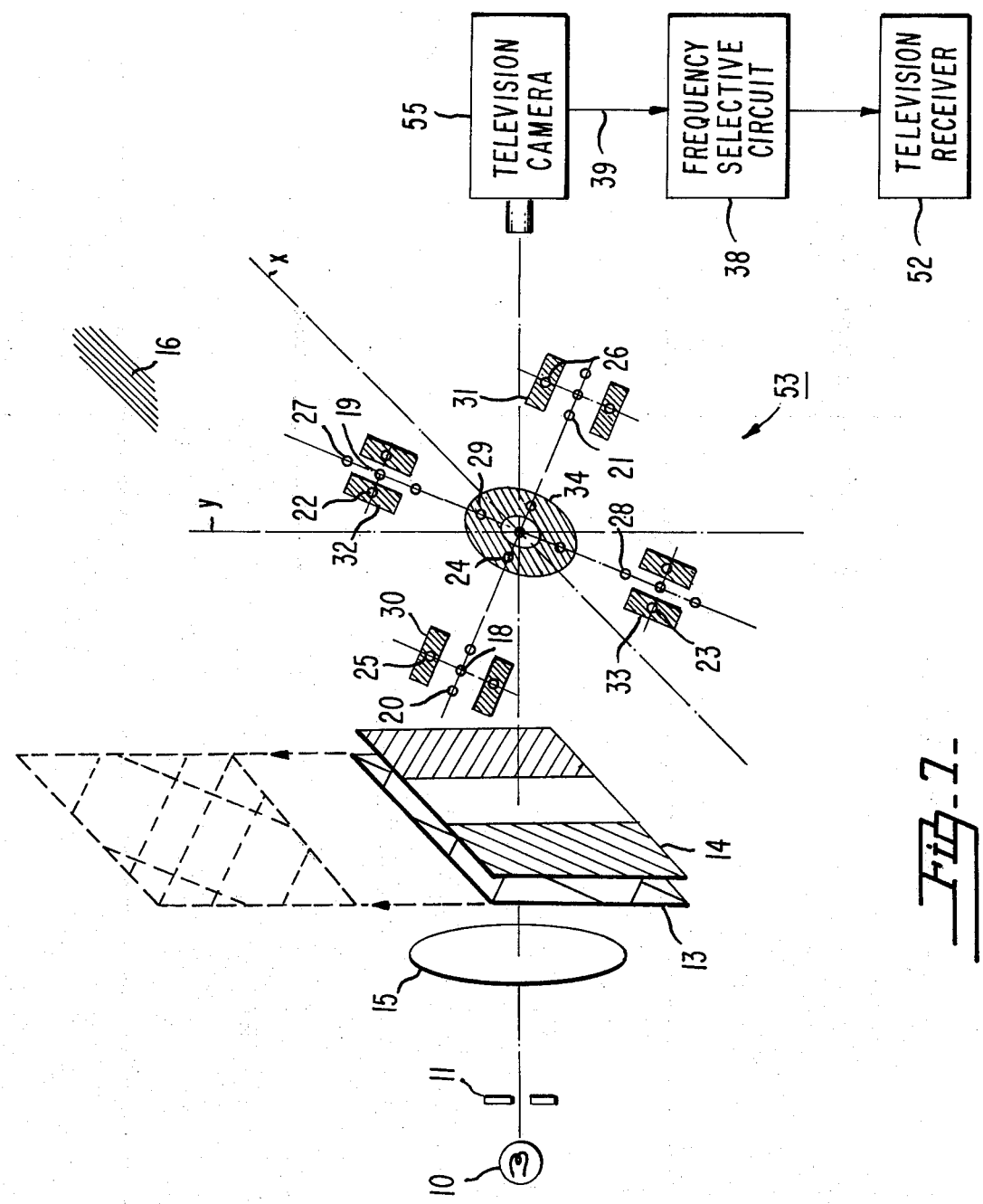

SINGLE FRAME COLOR ENCODING/DECODING SYSTEM

The present disclosure pertains to a single frame decoding system suitable for use in video cassette or film chain applications.

BACKGROUND OF THE INVENTION

The process of encoding color information in the scene on a black and white film had its genesis just before the turn of the twentieth century. In 1899, R. W. Wood published the results of his experiments on the use of diffraction gratings in color image formation. Later over the decades, various efforts in articulating the single frame color encoding concept gradually faded into the backdrop with the development of the multi-layer dye film processes. Recently the consumer electronics industry has introduced new products such as, video cassettes and video discs, in the consumer market for use with the home television receivers. The marketing of economical and practical home television cameras for in-house recording and playback is now within the realm of reality. The advent of video cassettes, video discs, and home television cameras has once again evoked the interest of the consumer electronics industry in the single frame color encoding processes.

Two generally known prior art systems in the art of the single frame color encoding/decoding processes are illustrated in (1) U.S. Pat. No. 3,378,633, issued to A. Macovski, and entitled MONOCHROME PHOTOGRAPHY SYSTEM FOR COLOR TELEVISION, and (2) U.S. Pat. No. 3,573,353, issued to F. C. Henriques, et al., and entitled OPTICAL DETECTION SYSTEM AND METHOD FOR SPATIAL FILTERING. In the Macovski system, the color content of the scene is encoded on a transparency film chain on separate spatial carriers of low enough frequency to be resolvable by an ordinary single tube television camera, but still of high enough frequency to embrace most of the significant picture detail in the scene. During playback the transparency may be directly imaged on the photoelectrode of the single tube television camera. The electron beam of the camera, scanning the photoelectrode image, converts the spatial carriers of the image into the temporal electrical carriers of corresponding frequency. The frequency selective circuit is coupled to the output electrode of the camera for obtaining separate signals representative of individual components of the color content of the scene. The difficulty with the Macovski system is that during playback the film jitter is translated into the frame-to-frame misalignment of the spatial carriers imaged on the photoelectrode, and thereby precipitating a color washout.

In the Henriques system, color content of the scene is encoded on a transparency film chain on separate spatial carriers of high frequency and different orientations. To reconstruct the color scene, the white light waves, modulated by the high frequency spatial carriers of the transparency, are brought to a focus in the Fourier transform plane. In the transform plane a diffraction pattern corresponding to the spatial frequencies of the transparency appears, with the individual color components occupying different parts of the pattern. The frequencies and orientations of the spatial carriers of the transparency are chosen to ensure a relatively easy identification of various parts of the diffraction pattern. It is noted that the selection of high spatial frequencies, to ensure relatively wide separation of the diffraction orders, would inevitably result in the choice of frequencies beyond the resolution capability of ordinary television cameras and certainly far above the resolution capability of a normal human eye. The zeroth order diffraction generally contains color mixture information, and is preferably masked. The first order diffractions, containing individual color components of the scene, are covered with appropriate color filters. For example, the light containing red component is filtered through a red filter, and so on. The filtered light may be directly imaged on the photoelectrodes of a color television camera. The difficulty with the Henriques system is that it requires a color television camera for color reproduction. In the Henriques system it is not practical to use a single tube television camera with a frequency selective circuit, as in the Macovski system; because, as indicated above, the high frequency spatial carriers needed in the Henriques system are generally beyond the resolution capability of an ordinary television camera. Moreover, even if one assumes, arguendo, that an economical television camera were available with sufficient resolution capability to overcome the above difficulty, unfortunately, the problem of color washout due to film jitter still remains in the Henriques system.

SUMMARY OF THE INVENTION

In accordance with the principles of the present invention, a single frame color encoding/decoding system is disclosed which requires neither an unusually stable film transport mechanism, nor a color television camera in the playback system. The color components of the scene modulate a plurality of relatively high frequency spatial carriers of the transparency in different orientations. A sufficiently limited bandwidth and spatially bounded energy source projects, a seriatim, a set of transparencies. A grating is rigidly fixed to the frame of a scanner adjacent to the transparency. The grating consists of a superposition of a plurality of unmodulated low frequency spatial carriers in different orientations. The color content of the scene is optically transferred from the transparency onto relatively stable and low frequency spatial carriers of the grating rigidly fixed to the scanner. A focusing means situated in the optical path obtains a diffraction pattern of the product of the transparency and the grating in the Fourier transform plane. A suitable masking means allows each color component, modulating only one of the spatial carriers of the grating, to pass beyond the transform plane. An imaging means images the output of the masking means on an image plate. The scanner electron beam scans the image plate for translating the spatial frequencies of the image into corresponding temporal electrical frequencies in the output of the scanner. A frequency selective circuit is coupled to the output electrode of the scanner for obtaining separate signals representative of the color components of the scene.

BRIEF DESCRIPTION OF THE DRAWINGS

The objects and advantages of the present invention will be recognized by those skilled in the art upon reading of the following detailed description and inspection of the accompanying drawings in which:

FIG. 7 is a functional block diagram of another embodiment of the invention.

DESCRIPTION OF THE INVENTION

Figure 1:
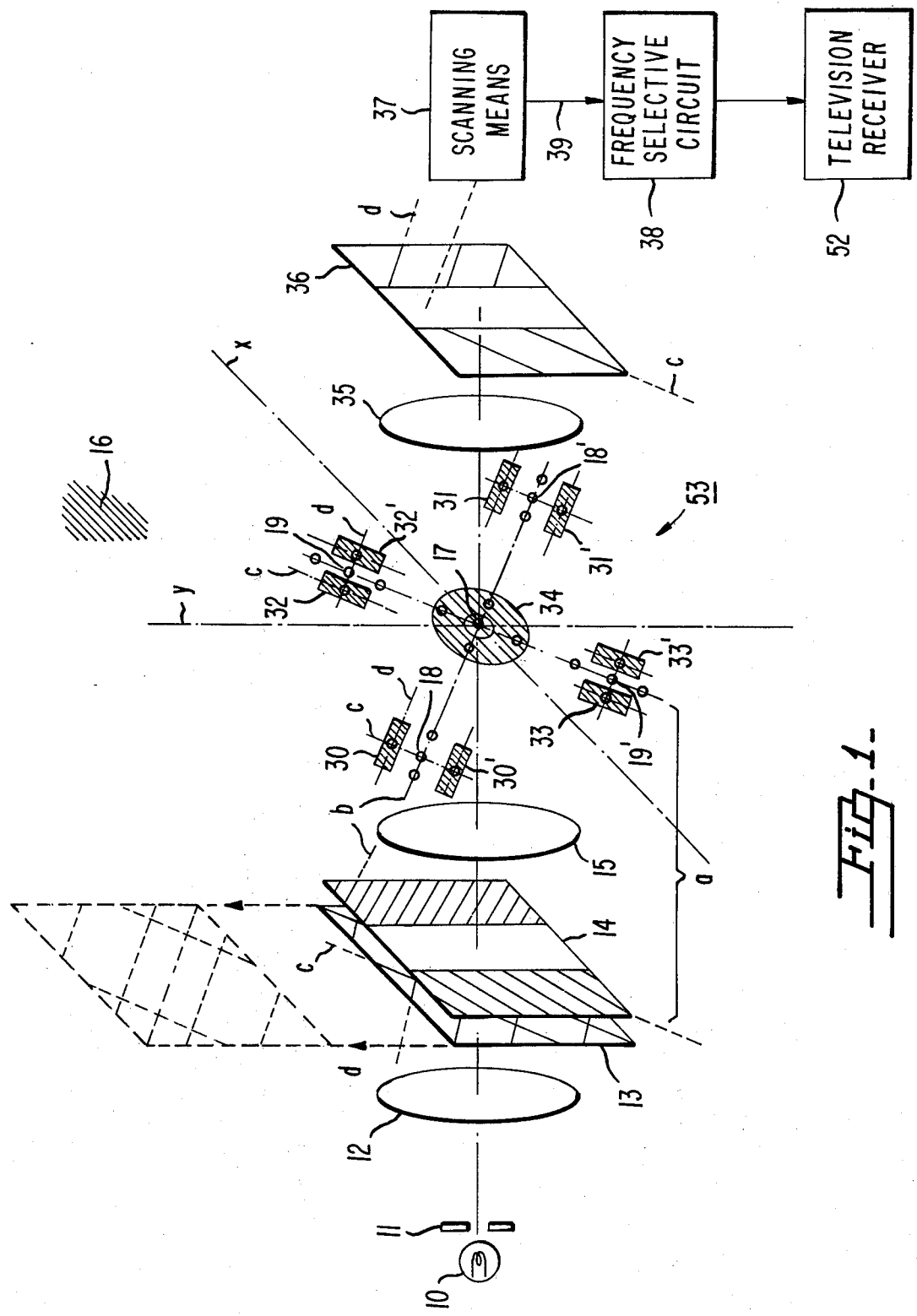
FIG. 1 is a functional block diagram of a single frame color encoding/decoding system in accordance with the present invention.
Figure 2:
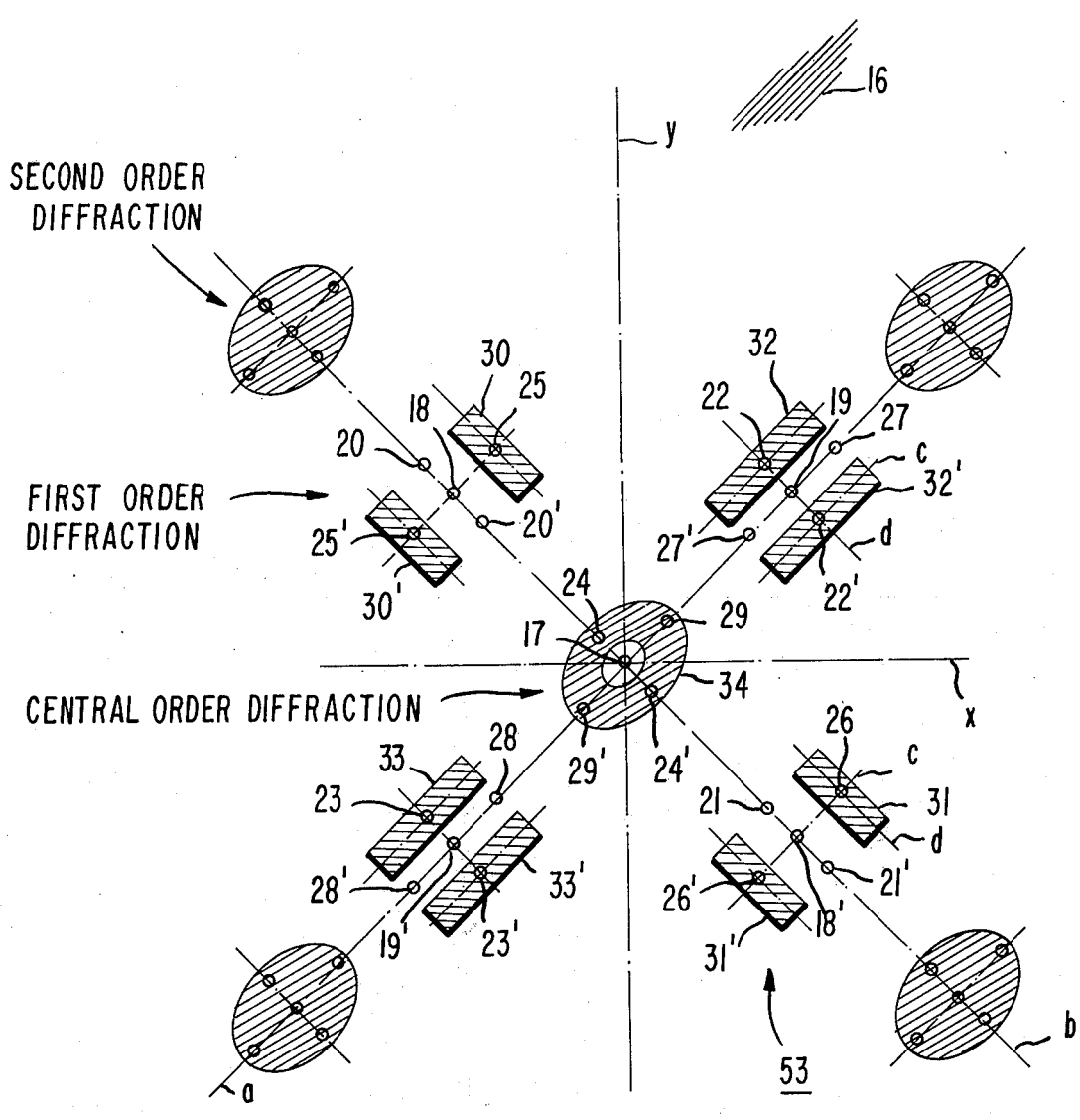
FIG. 2 illustrates various diffraction orders and side bands produced by the modulated spatial carriers in the Fourier transform plane by the single frame color encoding/decoding system of FIG. 1.
Figure 3:
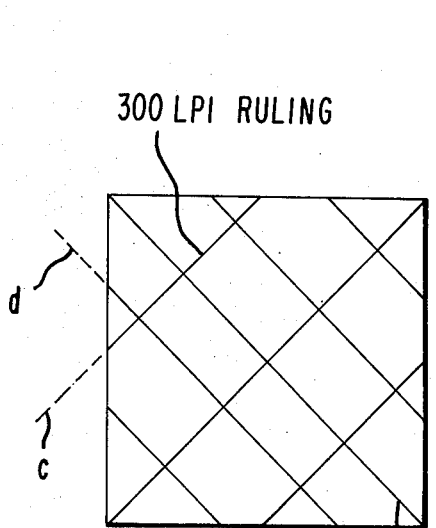
FIG. 3 illustrates a grating, consisting of a superposition of relatively low frequency unmodulated spatial carriers, suitable for use in the single frame color encoding/decoding system of FIG. 1.
Figure 4:
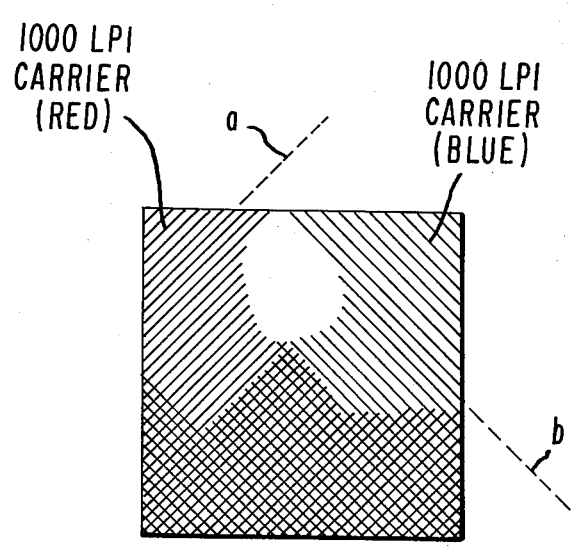
FIG. 4 illustrates a transparency, carrying color content of the scene on relatively high frequency spatial carriers, suitable for use in the single frame color encoding/decoding system of FIG. 1.
Figure 5:
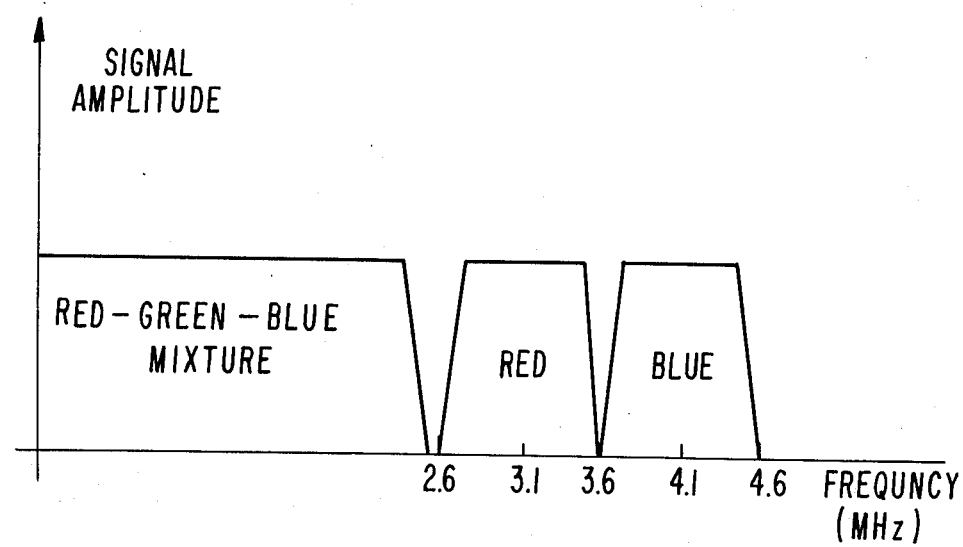
FIG. 5 illustrates spectral distribution of signals appearing at the output of a scanner suitable for use with the single frame color encoding/decoding system of FIG. 1.

Referring now to the drawings, wherein like reference numerals designate similar elements in the various figures, a substantially coherent light source 10 of FIG. 1 launches, a seriatim, spherical light waves through an adjacent pinhole in a screen 11. It is not necessary for the light source 10 to be strictly coherent. It is desirable that the light source 10 has a limited bandwidth and that it be sufficiently bounded spatially so that the diffraction orders in the Fourier plane can be suitably separated. The spherical light waves travel from the pinhole towards a collimating lens 12, filling at the lens an area at least equal to that of an encoded transparency 14. The spherical light waves are transformed by the collimating lens 12 into substantially plane light waves. A grating 13, rigidly fixed to the frame of a single tube television camera 37, is situated adjacent to the transparency 14 in the optical path. For a better understanding of the grating 13, refer to FIG. 3 in addition to FIG. 1. The grating consists of a superposition of a plurality of low frequency (e.g., 300 lines per inch in the c-direction, and 400 lines per inch in the d-direction) and unmodulated spatial carriers in quadrature. The spatial carriers need not be in quadrature. They can be oriented at any angles, as long as the diffraction orders in the Fourier plane can be conveniently separated. The number of the separate spatial carriers on the grating 13 is determined by the number of the scene color components of interest. The frequency of the spatial carriers of the grating 13 must be low enough to be resolvable by an ordinary single tube television camera but still high enough to include most of the significant picture detail in the scene. The scene color components modulate a plurality of high frequency (e.g., 1,000 lines per inch) spatial carriers of the transparency 14. For example, red component of the scene modulates 1,000 lpi spatial carrier of the transparency 14 arranged in the a-direction; blue component of the scene modulates 1,000 lpi spatial carrier of the transparency oriented in the b-direction, while the color mixture information in the scene may be present as a baseband signal. Also, more than two carriers may be used. For example, separate carriers for red, green, and blue scene information may be used to achieve a "fail to gray" failure mode in the event of camera defocusing. With only two carriers, defocusing and consequent carrier washout causes the scene to be tainted green. For a better understanding of the transparency 14, refer to FIG. 4 in addition to FIG. 1. The number of the individual spatial carriers of the transparency 14 is determined, also, by the number of the scene color components of interest. The frequency and orientation of the spatial carriers of the transparency 14 must be chosen to ensure a relatively easy separation of various parts of the diffraction pattern in the Fourier transform plane. It is noted that the selection of high spatial frequencies for the transparency 14, to ensure relatively wide distribution of the diffraction orders, would inevitably result in the choice of frequencies beyond the resolution capabilities of ordinary television cameras and certainly far above the resolution capability of a normal human eye. When the plane light waves pass through the grating 13 and the adjacent transparency 14, the scene color content is optically transferred from the high frequency (e.g., 1,000 lpi) spatial carriers of the transparency onto relatively stable (because rigidly fixed to the camera frame) and low frequency (e.g., 300 and 400 lpi) spatial carriers of the grating. A focusing lens 15 obtains a diffraction pattern in a Fourier transform plane 16 (x and Y coordinates). For a better understanding of the diffraction pattern 53, refer to FIG. 2 in addition to FIG. 1. Due to the 1,000 lpi transparency spatial carriers in the a-direction, a central order diffraction 17 and first order diffractions 18 and 18' are obtained, in the transform plane 16, in a direction perpendicular to the a-direction. The higher order diffractions, above the first order diffractions, are not shown in the transform plane 16 for simplicity and clarity. Similarly, due to the 1,000 lpi transparency spatial carriers in the b-direction, a central order diffraction, also at 17, and first order diffractions 19 and 19' are obtained in the transform plane 16, in quadrature to the b-direction. As illustrated in FIG. 2, a closely spaced sideband pairs 20–20', 21–21', 22–22', 23–23', and 24–24' are obtained, adjacent to the central and first order diffractions due to the high frequency (1,000 lpi) transparency spatial carriers, in a direction perpendicular to the c-direction due to the low frequency (300 lpi) grating spatial carriers. Similarly, a closely spaced sideband pairs 25–25', 26–26', 27–27', 28–28', and 29–29' are obtained in a direction in quadrature with the d-direction due to the low frequency (400 lpi) grating spatial carriers. It is noted that the choice of a grating spatial carrier frequencies (here, 300 and 400 lpi) as, approximately, less than one-half of the transparency spatial carrier frequency (here, 1,000 lpi) causes the sideband pairs, e.g., 20–20' through 29–29', due to the grating 13 to lie close to the diffraction orders due to the transparency 14 carriers, e.g., 17 through 19. It is desirable to have such relationship, between the grating 13 frequencies and the transparency 14 frequencies, to permit a simple identification by association of the individual components in the transform plane 16, whereby a subsequent masking process is considerably aided. The diffraction orders are suitably masked in the transform plane 16 to ensure that each color component is carried by only one of the relatively stable and low frequency spatial carriers of the grating 13 on the output side of the transform plane. For example, the red component of the scene modulates only the 300 lpi grating spatial carrier in the c-direction, and the blue component of the scene is present only on the 400 lpi grating spatial carrier in the d-direction. The masks 30–30' and 31–31' ensure that the red content of the scene modulating the transparency carrier in the a-direction is absent on the 400 lpi grating spatial carrier. Similarly, the masks 32–32' and 33–33' assure that the blue content of the scene modulating the transparency carrier in the b-direction is not carried by the 300 lpi grating spatial carrier. The mask 34 prevents the zeroth order diffraction, containing mixture information, from appearing as the deleterious beat frequencies on the low frequency (e.g., 300 and 400 lpi) carriers. Thus, the mixture information will appear only as a part of the baseband signal in the output of the mask 34. An imaging means 35 images the scene color components, riding on the separate, stable, and low frequency spatial carriers of the grating 13, on an image plate 36. A scanner 37 scans the image developed on the image plate 36, the scanning electron beam of the scanner translating the spatial frequencies of the grating into corresponding temporal electrical frequencies in the output of the scanner. A single tube television camera may incorporate the imaging means 35 (e.g., lens), the image plate 36 (e.g., photoelectrode), and the scanner 37. FIG. 5 indicates the spectral distribution in the output of the scanner. Note that the color mixture information is present as a baseband in the output signal. Referring again to FIG. 1, a standard frequency selective circuit 38 is coupled to the output of the scanner 37 for obtaining therefrom a set of separate signals representative of the individual color components of the scene.

Figure 6:
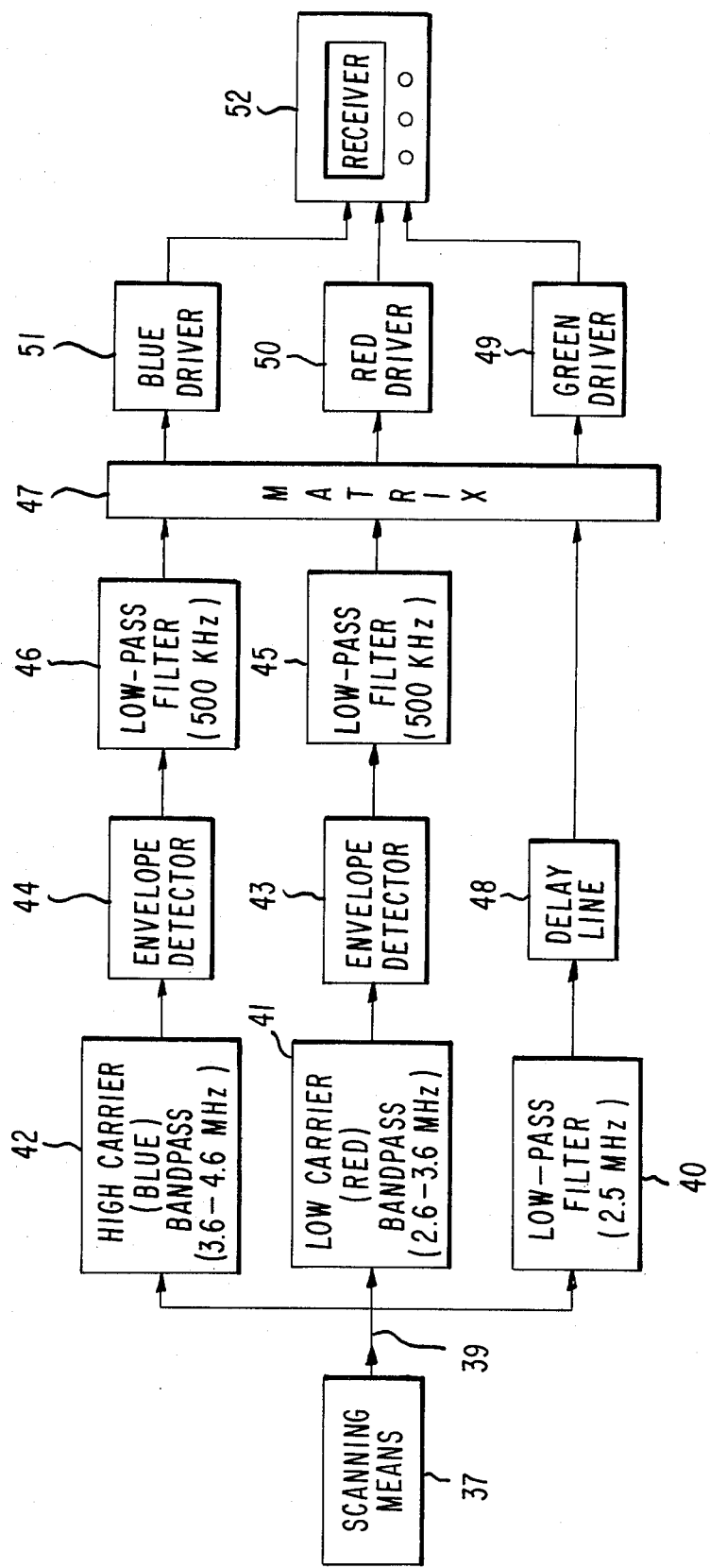
FIG. 6 illustrates a block diagram of a frequency selective circuit for deriving separate color representative signals suitable for use in the single frame color encoding/decoding system of FIG. 1.

A suitable arrangement of the frequency selective circuit is shown in FIG. 6. The output signal of the scanner 37 is taken from an output lead 39 and applied simultaneously to a low-pass filter circuit 40 having a cutoff frequency of 2.5 MHz and to bandpass filter circuits 41 and 42 which pass, respectively, the signal frequencies in the ranges 2.6 to 3.6 MHz and 3.6 to 4.6 MHz. The bandpass of filter 41 includes the carrier frequencies generated by the 300 lpi grating spatial carrier carrying the red component of the scene. Similarly, the bandpass of filter 42 includes the carrier frequencies generated by the 400 lpi grating carrier carrying the blue component of the scene. The outputs of the bandpass filters 41 and 42 are applied, respectively, to envelope detectors 43 and 44. The outputs of the envelope detectors 43 and 44 are coupled, respectively, to low-pass filters 45 and 46 having a cutoff frequency of 0.5 MHz. The outputs of the low-pass filters are applied to a matrix circuit 47. The output of the low-pass filter 40 is coupled to a delay line 48 to compensate for the delay introduced in the other electrical paths due to the envelope detectors 43 and 44 and the low-pass filters 45 and 46. The output of the delay line 48 is coupled to the matrix circuit 47. The matrix circuit 47 combines the input signals in the conventional manner to produce a set of signals representative of the color components of the scene. The matrix circuit 47 output is coupled to the blue, red and green drivers (respectively, 49, 50 and 51) of an image display device 52.

FIG. 7 is a functional block diagram of another embodiment of the present invention. A lens may be interposed between the light source 10 and the screen 11 to collect the light emerging from the source and re-image it on the pinhole in the screen. Spherical light waves, emerging from the pinhole, travel toward the focusing lens 15, filling at the lens an area at least equal to that of the transparency 14. The lens 15 re-focuses the light passing through it onto the transform plane 16. As the light has passed through the grating 13 and the transparency 14 after exiting the focusing lens 15, the image in the transform plane consists of relatively widely scattered diffraction spots due to the spatial carriers of the transparency surrounded by the sideband paris due to the spatial carriers of the grating. A suitable masking apparatus 30 through 34 limits the output as set out in the description of FIG. 1. An imaging lens incorporated in a single tube television camera 55 images the output of the masking apparatus (30 through 34) directly on the photoelectrode of the single tube television camera. The output signals of the camera 55 are processed by the frequency selective circuit 38 and appropriate color component representative signals are applied to the television receiver 52. The advantage of FIG. 7 configuration over that shown in FIG. 1 are as follows. First, the collimating lens 12 of FIG. 1 is not required in the FIG. 7 arrangement. Second, in the FIG. 7 arrangement the imaging lens and the image plate are incorporated in the television camera 55.

Recapitulating, the single frame color encoding/decoding system eliminates the need for a color television camera in the playback system. This is possible because the color content of the scene, modulating the relatively high frequency spatial carriers of the transparency beyond the resolution capability of an ordinary television camera, is optically transferred onto the low frequency spatial carriers of the grating which are within the resolution capability of an ordinary television camera.

Again, the single frame color encoding/decoding system eliminates the "color washout" problem introduced by the commonly encountered film jitter. As indicated before, the color content of the scene is transferred onto relatively stable spatial carriers of the grating which is rigidly fixed to the frame of the camera.

Encoding of the color content of the scene on a monochromatic film or a black and white panchromatic film has numerous advantages. First, the monochromatic or black and white films are very much cheaper than color films. Second, a much wider range of film speeds are available in the monochromatic or black and white films as compared to color films. The color washout problem, the need for expensive striped filters, or color television cameras, had boggled efforts in development of the practical and economical single frame color systems. It is believed that the use of relatively cheap grating, according to the invention, overcomes the problems enumerated above and opens new vistas in the area of single frame color photography.

What is claimed is:

1. A single frame color encoding/decoding system comprising:
   A. an image plate;
   B. means for scanning an image developed on said image plate; and said scanning means having a passband such that only frequencies below an upper cutoff frequency are directly resolved by said scanning means;
   C. a source of sufficiently limited bandwidth and spatially bounded radiant energy for projecting a transparency;

said transparency carrying individual information components on separate, relatively high frequency, spatial carriers oriented in different directions; and the frequencies of said relatively high frequency spatial carriers being above said upper cutoff frequency of said scanning means;
- D. a grating rigidly fixed to said scanning means positioned adjacent to said transparency in the path of said radiant energy; said grating consisting of superposition of a plurality of unmodulated, relatively low frequency, spatial carriers also disposed in different orientations; and the frequencies of said relatively low frequency spatial carriers being below said upper cutoff frequency of said scanning means;
- E. means positioned in the path of said radiant energy for obtaining a diffraction pattern of the product of said encoded transparency and said grating on a transform plane;
- F. means for masking in said transform plane so as to limit each individual information component, encoded in said transparency, to remain on only one of said relatively low frequency spatial carriers of said grating in the output of said masking means;
- G. means for imaging the output of said masking means on said image plate, wherein said scanning means translates said low frequency spatial carriers on said image plate into corresponding temporal electrical carriers in the output of said scanning means; and
- H. frequency responsive means coupled to the output electrode of said scanning means for obtaining therefrom signals representative of said individual information components.

2. A system as defined in claim 1 wherein said imaging means, image plate and scanning means are incorporated in a single tube television camera, wherein the frequencies of said grating spatial carriers are within the resolution capability of the camera, and wherein said transparency spatial carriers are outside the resolution capability of the camera.

3. A system as defined in claim 2 wherein the frequencies and orientations of said transparency spatial carriers are such as to ensure relative wide scattering of said diffraction pattern whereby said masking in said transform plane is facilitated.

4. A system as defined in claim 3 wherein the frequencies of said grating spatial carriers are less than one-half the frequencies of said transparency spatial carriers.

5. A system as defined in claim 4 wherein said radiant energy is in the form of light.

6. A system as defined in claim 5 wherein the orientations of said grating spatial carriers are substantially parallel to the orientations of said transparency spatial carriers during playback.

7. A system as defined in claim 6 wherein said information components in said transparency carry, respectively, a first selected component color of a scene, and a second selected component color of said scene.

8. A system as defined in claim 7 wherein the brightness component of said scene is present as a baseband signal.

9. A system as defined in claim 8 wherein said transparency spatial carriers have frequency of one thousand cycles per inch and, wherein said grating spatial carriers have frequency of, respectively, three hundred and four hundred cycles per inch.

10. A system as defined in claim 9 wherein said transparency spatial carriers are oriented in quadrature.

11. A system as defined in claim 10 wherein said grating spatial carriers are oriented in quadrature.

12. A system as defined in claim 11 wherein said encoded transparency and said adjacent grating are situated between said diffracting means and said transform plane.

13. A system as defined in claim 1 wherein a collimating means is interposed between said energy source and remainder of said decoding system for converting said spherical wavefronts into substantially plane wavefronts.

14. A system as defined in claim 1 wherein said encoded transparency and said adjacent grating are situated between said collimating means and said diffracting means.

* * * * *